United States Patent [19]

Reighard et al.

[11] Patent Number: 5,505,763
[45] Date of Patent: Apr. 9, 1996

[54] SYSTEM AND METHOD FOR CONTROLLING AIR FLOW THROUGH A POWDER COATING BOOTH

[75] Inventors: Michael A. Reighard, Avon Lake; Peter G. Lambert, Chagrin Falls; Robert G. Loosli, So. Amherst, all of Ohio

[73] Assignee: Nordson Corporation, Westlake, Ohio

[21] Appl. No.: 319,674

[22] Filed: Oct. 7, 1994

[51] Int. Cl.⁶ .................................................. B01D 46/00
[52] U.S. Cl. .................... 95/19; 55/210; 55/270; 55/283; 55/467; 55/DIG. 46; 95/280
[58] Field of Search .................... 55/210, 270, 302, 55/467, 283, 284, DIG. 46; 95/19, 280, 22; 118/326; 454/53

[56] References Cited

U.S. PATENT DOCUMENTS

| | | |
|---|---|---|
| 3,332,215 | 7/1967 | Revell . |
| 4,277,255 | 7/1981 | Apelgren . |
| 4,447,249 | 5/1984 | Kopena . |
| 4,506,625 | 3/1985 | Vohringer .................... 55/DIG. 46 |
| 4,521,226 | 6/1985 | Alig et al. . |
| 4,600,608 | 7/1986 | Ankrett . |
| 4,653,387 | 3/1987 | Osawa et al. . |
| 4,729,295 | 3/1988 | Osawa et al. . |
| 4,753,665 | 6/1988 | Fahey ........................... 55/270 |
| 4,786,295 | 11/1988 | Newman et al. ............... 55/270 |
| 4,820,317 | 4/1989 | Fahey . |
| 4,879,970 | 11/1989 | Barkalow et al. . |
| 5,078,084 | 1/1992 | Shutic et al. . |
| 5,095,811 | 3/1992 | Shutic et al. . |
| 5,261,934 | 11/1993 | Shutic et al. . |
| 5,356,334 | 10/1994 | Gray . |

OTHER PUBLICATIONS

Binks Mfg. Co., (Binks/Sames) Powder Recovery Spray Booth—Bulletin A27-47R.-1 Printed in U.S.A. Oct. 1992.

*Primary Examiner*—C. Scott Bushey
*Attorney, Agent, or Firm*—Howard M. Cohn

[57] ABSTRACT

According to the invention, a system and method for controlling air flow through the interior of a powder spray booth includes a powder collection system for collecting oversprayed powder from the interior of the spray booth. The powder collection system includes a powder collector with a powder collection chamber, a pulse plenum chamber, and a fan plenum chamber containing a motor driven fan for drawing the air-entrained powder into the fan plenum chamber so that the oversprayed powder is collected on the cartridge filters and filtered air is exhausted from the fan plenum chamber through one or more final filters. A control system automatically adjusts the speed of the motor driven fan in response to pressure changes in the pulse plenum chamber and the fan exhaust chamber so that a substantially constant air flow is maintained through the powder collector.

20 Claims, 7 Drawing Sheets

FAN SPEED CURVE

SYSTEM AND METHOD FOR CONTROLLING AIR FLOW THROUGH A POWDER COATING BOOTH

FIELD OF THE INVENTION

The invention relates to make-up type spray booths, and more particularly, to a spray booth for applying powder coating material onto articles and a powder collector for collecting oversprayed powder from said spray booth which are operated in conjunction with each other so that a constant air flow is maintained through the powder spray booth.

BACKGROUND OF THE INVENTION

Powder spray systems are well known in the art and representative systems are disclosed, for example in U.S. Pat. No. 5,261,934 ('934), assigned to Nordson Corp. of Westlake, Ohio, the assignee of this invention, which patent is incorporated in its entirety herein. As disclosed in the patent '934, the practice of powder coating involves spraying a powdered coating material onto an object or workpiece and thereafter heating the object and the powder so that the powder melts. When subsequently cooled, the melted powder forms a solid, continuous coating on the object. In many instances, an electrostatic charge is applied to the sprayed powder and the object is electrically grounded to increase the quantity of powder which attaches to the object and to assist in retaining the powder thereon.

Powder deposition is usually performed in a spray booth, i.e., an enclosure wherein any oversprayed powder which is not deposited on the object can be collected. Conventionally, the containment of oversprayed powder in the spray booth is aided by an exhaust system which creates a negative pressure within the spray booth and draws the powder entrained in a stream of air out of the spray booth into a powder recovery unit, also called a powder collector. In the powder collector, the particles of powder are separated from the air by a filter media, collected in a hopper, and then usually returned to the powder supply for sieving and recirculating to the spray gun. The resulting cleaned air, now free of the powder, is usually passed through final filters and discharged into the room or recirculated back to the conditioned air supply for the spray booth.

One problem associated with make-up spray booths of the type described above is to obtain a constant velocity air flow regardless of the variation in the available volume for air flow through the interior of the booth, while concurrently ensuring that contaminants do not enter or leave the booth interior. This type of constant velocity air flow within the spray booth is desirable to minimize disruption of the flow path between the powder dispensing devices and the object so that a uniform coating is obtained on the object and to further ensure that a high percentage of the amount of powder being sprayed attaches to the object, i.e., a high transfer efficiency.

It has been suggested that one way of obtaining such constant velocity flow conditions within the spray booth is to operate an air infeed blower and an air exhaust fan at a relative speed with respect to each other so that the quantity of air entering the booth is equal to the quantity of air withdrawn from the booth. A problem with this design is that no provision is made for accommodating changing conditions within the booth interior caused by the number and position of the objects moving therethrough. That is, no accommodation is made for variations in the volume of air required to maintain constant downdraft velocity in the spray booth as the progression of a object through the application area displaces actual make-up air volume requirements.

These limitations have been addressed to some extent in systems of the type disclosed in U.S. Pat. No. 4,653,387 to Osawa et al. This patent discloses air feed-type paint spray booths in which the air flow through the booth is varied in accordance with sensed conditions in the booth interior such as booth pressure and/or the air velocity at the inlet and outlet of the booth. For example, the Osawa patent includes an air infeed fan and an air exhaust fan whose speed of operation are varied in response to the air flow sensed at the inlet and/or outlet to the booth. One problem with this design is the inaccuracy of the pressure and/or velocity measurements taken within the interior of the spray booth, particularly when coating physically large objects which displace substantial quantities of air in the course of movement through the booth, i.e., as the object enters or exits the booth compared to intervals when no object is present at the booth inlet or outlet. Another problem is that the air velocity can be so low in the booth interior that it is difficult to measure, which in turn can result in the velocity of the air moving through the booth being incorrectly adjusted because the speed of the air infeed blower and/or air exhaust fan is dependent upon such measurements of velocity.

Another type of make-up type spray booth is disclosed in U.S. Pat. No. 5,095,811 ('811) to Shutic et al., assigned to Nordson Corporation, the assignee of the present invention, which patent is incorporated in its entirety herein. In the design of the '811 patent, the interior of the spray booth is divided into separate coating zones divided by transition zones. The air infeed and exhaust devices associated with each coating zone and each transition zone are operated to vary flow rate within the booth interior in the course of movement of the item passing through such that the air velocity in each coating zone is maintained below a predetermined maximum downdraft velocity throughout the coating operation, and such that a slightly negative pressure is maintained within the booth interior.

While the previously discussed booth designs have partially addressed the problem of providing a constant air flow through a spray booth, there are still deficiencies in these booth designs relating to the control of the air flow through the powder coating booth to offset the change in air flow corresponding to the build-up of coating powder on the exterior surface of the cartridge filters in the powder collector from the passage of the air entrained stream of oversprayed powder being drawn from the booth into the powder collector. That is, the amount of air which can be drawn through the filters is directly dependent upon the build up of powder on the cartridge filter. This variation in air flow causes problems both at start up when the filters are clean and a high volume of air can be drawn the filters and then after some period of time when the powder buildup allows a much lower volume of air to be drawn therethrough. Also, the filters are periodically subjected to pulse cleaning when a blast of air, directed through the inside of the filter, causes the accumulated powder on the outside surface of the filter to fall off. This, will cause a rapid rise in the volume of air flow through the filter and often change the air flow within the powder booth. As previously mentioned, changes in the air flow through the booth can reduce the transfer efficiency and change the spray pattern from the spray guns.

This problem is partially resolved by seasoning the cartridge filters, that is spraying the cartridge filters with powder prior to coating parts with powder, so that the air flow is initially reduced. Cartridge filters can require from 3 to 30 pounds of powder during seasoning. While the variation in the air flow through the spray booth is reduced, seasoning is a time consuming, expensive operation. The reduction in variations in air flow within the powder coating booth also lessens the effect on the spray patterns emitted from the spray gun. Further, it is desirable to improve the transfer efficiency of the powder coating material onto the parts being sprayed by closely controlling the speed of the fan drawing the oversprayed powder into the powder collector from the powder booth.

Another problem relating to the prior art booth designs is that the motor operated fans, used to draw the stream of air entrained, oversprayed powder from the booth into the powder collector, use a great deal of power and generate a high level of noise.

OBJECTS AND SUMMARY OF THE INVENTION

It is an object of the present invention to provide a method and system for maintaining a substantially constant air flow through the interior of a powder coating booth by regulating the fan speed in a powder collector which obviate the problems and limitations of the prior art systems.

It is a further object of the present invention to provide an improved method and system for maintaining a substantially constant air flow through a powder collector and the interior of a powder coating booth to increase the transfer efficiency of the coating powder onto the objects being sprayed in the coating booth.

Yet another object is to provide method and system for maintaining a substantially constant air flow through the interior of a powder coating booth to eliminate the need for seasoning the cartridge filters in a powder collection system prior to system startup.

Still another object is to provide method and system for maintaining a substantially constant air flow through the interior of a powder collector so that the operating cost of the system is reduced.

Another object is to provide method and system for maintaining a substantially constant air flow through a powder collector by pulling air entrained powder from a powder coating booth so that the sound level of the system is reduced.

According to the invention, a system for controlling air flow through the interior of a powder spray booth includes a powder collection system located adjacent to the powder spray booth for collecting oversprayed powder from the interior of the spray booth. The powder collection system includes a powder collector having a powder collection chamber with an exhaust opening and one or more air inlet openings with one or more cartridge filters mounted thereto. A pulse plenum chamber having an exhaust port is connected to the air inlet openings. Air pulse elements within the pulse plenum chamber direct pulses of air through the inlet openings and into the cartridges. A fan plenum chamber has a fan inlet with a fan inlet cone connected to the pulse plenum chamber and a fan exhaust outlet. A motor driven fan within the fan plenum chamber draws air-entrained powder into the collection chamber so that oversprayed powder is collected on the cartridge filters and filtered air is drawn through the pulse plenum chamber, through the fan inlet cone into the fan exhaust chamber, and out of the fan exhaust outlet through one or more final filters. A control system automatically adjusts the speed the motor driven fan in response to pressure changes in the pulse plenum chamber and the fan exhaust chamber so that a substantially constant air flow is maintained through the powder collector.

According to the invention, a first embodiment of the control system to adjust the speed of the fan includes a differential pressure transducer to generate an inlet cone velocity pressure corresponding to the difference between the static pressure signal measured in the throat of the fan inlet cone and the total pressure signal corresponding to the pressure in the pulse plenum chamber. The difference between these signals is the inlet cone velocity pressure. The control system includes a controller receiving a signal corresponding to the inlet cone velocity pressure from the differential pressure transducer for calculating the actual air flow through the fan inlet cone with an equation where the actual airflow is proportional to the square root of the velocity pressure. Then, the actual air flow is compared to a preset commanded air flow to provide a resulting airflow differential. The resulting airflow differential is added to the preset commanded airflow to generate an adjusted air flow command. A fan speed signal corresponding to the adjusted air flow command air flow through the spray booth is outputted. A drive device, such as a frequency drive, receives the fan speed signal and adjusts the speed of the motor driven fan. Also, the control system can manually set the speed of the motor driven fan.

According to a second embodiment of the invention, the control system to adjust the speed of the fan includes two differential pressure transducers to output a pulse plenum pressure signal corresponding to the pressure in the pulse plenum chamber and a fan plenum pressure signal corresponding to the pressure in the fan plenum chamber. The pulse plenum pressure signal and the fan plenum pressure signal are totaled together in a controller to determine a total pressure. The controller then a) determines the actual air flow through the powder collector, b) compares the actual air flow through the powder collector to a desired air flow through the powder collector, and c) generates a fan speed signal corresponding to the desired air flow through the spray booth. Then, as in the first embodiment, a drive device receiving the fan speed signal adjusts the speed of the motor driven fan.

According to the invention, the method of controlling air flow through the interior of a powder spray booth, comprises the following steps. The oversprayed powder is collected from the interior of the spray booth in a powder collection system located adjacent to the powder spray booth. Air-entrained, oversprayed powder drawn through an exhaust opening in a powder collector is collected from the spray booth on one or more cartridge filters mounted to air inlet openings in the powder collector. Next, clean air filtered through the cartridge filters is drawn into a pulse plenum chamber. The clean air is then drawn through a fan inlet of a fan plenum chamber with a motor driven fan connected by a fan inlet cone to the fan inlet. The clean air is exhausted through a fan exhaust outlet from the pulse plenum chamber through one or more final filters. The speed of the motor driven fan is automatically adjusted in response to pressure changes in the pulse plenum chamber and the fan exhaust chamber so that a substantially constant air flow is maintained through the powder collector.

According to one embodiment of the invention, the step of adjusting the speed of the motor driven fan includes the following steps. A velocity pressure signal is generated corresponding to the difference between the static pressure in the fan inlet cone and the total pressure in the pulse plenum chamber. Using the velocity pressure signal, the actual air flow through the fan inlet cone is next determined. The actual air flow is compared to a command air flow and an adjusted air flow command is determined. A fan speed signal is next generated corresponding to the adjusted air flow command through the powder collector. Then, the speed of the motor driven fan is adjusted.

In a second embodiment, the step of adjusting the speed of the motor driven fan includes the following steps. A total pressure signal equal to the combined pulse plenum pressure and the fan plenum pressure is determined. The total pressure is compared to fan curve equations and the actual air flow through the powder collector is determined. The actual air flow is compared to a preset commanded air flow through said powder collector and a fan speed signal is generated corresponding to the desired air flow through the powder collector. Then, the speed of the motor driven fan is adjusted so that a substantially constant airflow substantially is maintained through said powder collection system and said spray booth.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
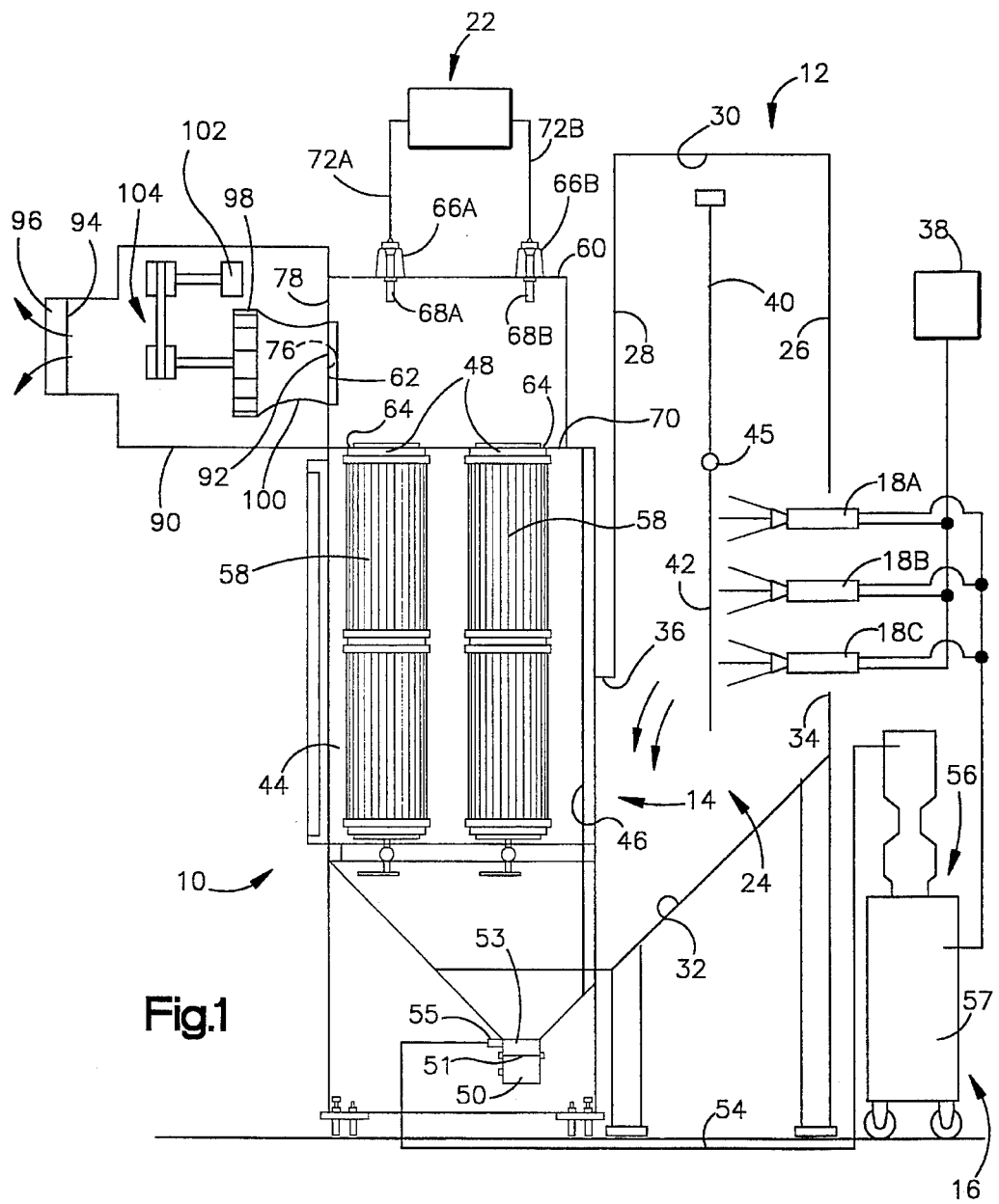
FIG. 1 is a schematic illustration of a powder collection system including a powder coating booth and a powder collector which includes a system for controlling air flow through the interior of the coating booth, in accordance with the invention.

Referring to FIG. 1, a powder coating system 10 is illustrated. The overall construction of the powder coating system 10 forms no part of this invention per se and is described only briefly herein. A more thorough description of the overall system is described in the U.S. Pat. No. 5,261,934 patent.

The powder coating system 10 includes a spray booth 12, a powder collector unit 14, a powder supply 16, powder spray guns 18A,18B,18C, and a control system 22. The spray booth 12 is illustrated schematically and typically comprises an enclosed spray chamber 24 having side walls 26, 28, a ceiling 30 and a floor 32. One or more gun openings 34 are provided in the side wall 26. An exhaust opening 36 in the side wall 28 provides a passageway through which air-entrained, oversprayed powder is drawn into the powder collector 14, as discussed below. One or more spray guns 18A,18B,18C, connected to powder supply 16 and a power supply 38, project through gun opening 34 in side wall 26 and are aimed at the interior of spray chamber 24. A conveyor 40, supporting a workpiece 42 on a conventional fixture 45, moves the workpiece to be sprayed past spray guns 18A,18B,18C.

Powder collector 14 includes a powder collection chamber 44 having an exhaust opening 46, a plurality of air inlet openings 48, and a fluidizing air plenum 50, disposed below the chamber 44, and separated from chamber 44 by a fluidizing plate 51. A pump (not shown), pumps air into the air plenum 50 and through fluidizing plate 51 so that oversprayed particles collected within chamber 44 are fluidized. A collection trough 53 is located in the lowermost portion of the chamber 44, directly above fluidizing plate 51, to collect the powder. A pump 52 (not shown) is connected to collection trough 53 through outlet 55 for pumping the collected powder back to feed hopper 57 of powder supply 16 through line 54 for sieving and recirculation through line 56 to spray guns 18A,18B,18C.

A plurality of stacked primary cartridge filters 58 are mounted to air inlet openings 48 at the top wall of collection chamber 44, by means such as discussed in the '934 patent, for collecting air-entrained, oversprayed powder drawn through exhaust opening 46 from the enclosed chamber 24 of spray booth 12. While only two stacks of cartridge filters are illustrated, it is within the terms of the invention to provide any number of cartridge filters, stacked or not stacked, as required.

With reference to FIG. 1, powder collector 14 includes a pulse plenum chamber 60 having an exhaust port 62 and inlet ports 64 being connected to air inlet openings 48. Two air pulse elements 66A and 66B, connected to a source of pressurized air (not shown), are mounted to extend within chamber 60. Each air pulse element 66A, 66B includes a nozzle 68A,68B aligned with the inlet openings 48 through the lower wall 70 so that pulses of air can be sequentially directed into cartridge filters 58 to knock off accumulated powder from the outer surface of the filters and onto collection trough 53 located above the fluidizing plate 51 in chamber 44 to collect the powder, as discussed before. Each air pulse element 66A,66B is connected by a signal line 72A,72B to controller 22 which sequences the opening and closing of the pulse elements. While a single pulse plenum chamber 60 is illustrated, it is within the scope of the invention to provide a plurality of pulse plenum chambers, as shown and described in the '934 patent.

The fan exhaust chamber 90 of powder collector 14 has a fan inlet connected to the exhaust port 76 of pulse plenum chamber 60 and a fan exhaust outlet 94. Normally, a plurality of final filters 96 are provided at the outlet 94 of exhaust chamber 90 for filtering any fine particles of powder which were not removed by the filter cartridges 58. Fan exhaust chamber 90 has a motor driven fan 98, such as a SAFK FAN, manufactured by Chicago Blower Corporation, mounted to an outlet section of inlet cone 100, which in turn is secure at an inlet section to fan inlet. Fan 98 is driven by a motor 102 through a conventional belt and pulley arrangement 104 to draw the air-entrained powder from powder booth 12 into powder collection chamber 44 so that the oversprayed powder is collected on cartridge filters 58 and filtered air is drawn through the pulse plenum chamber 60, into fan exhaust chamber 90, and out of fan exhaust outlet 94 through final filters 96.

Two different embodiments of control 22 are described below to control the airflow through powder booth 12, as shown in FIG. 1. In both embodiments, the air flows through booth 12 and the oversprayed air entrained powder is drawn through into powder collector 14 to be separated by filters 58 into powder for recycling back to feedhopper 57 and cleaned filtered air to be exhausted through filters 96 and into the room or recirculated back to the conditioned air supply for the spray booth.

Figure 3:
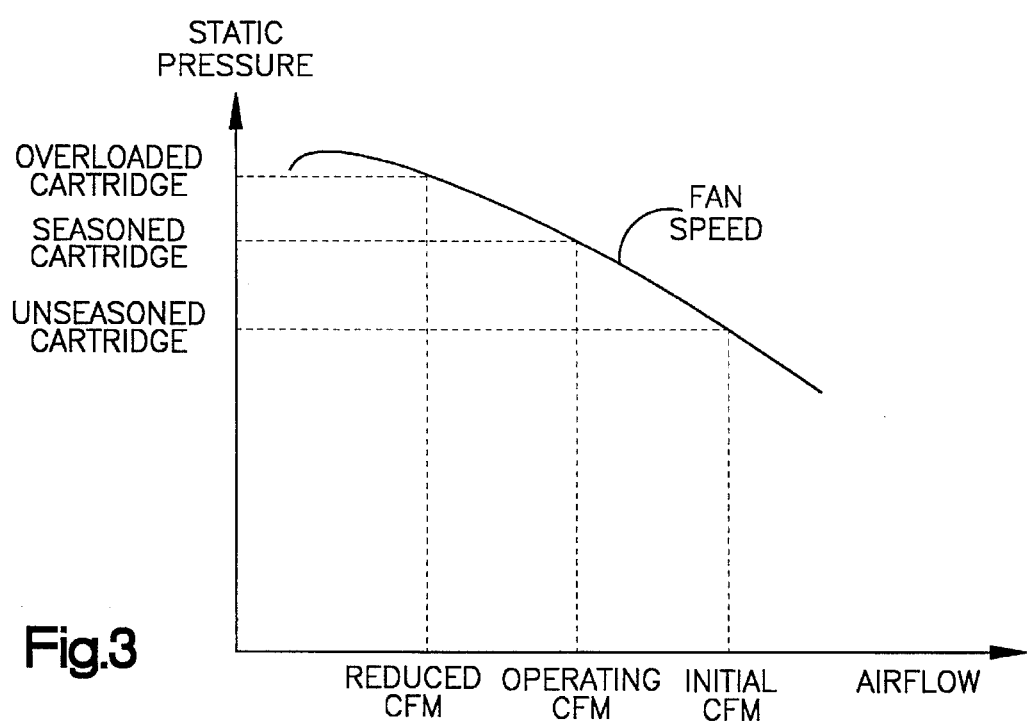
FIG. 3 is a typical fan curve for the control system shown in FIG. 2 showing the relationship between the pressure and airflow depending on the accumulation of powder on the filter cartridges.

To better understand the operation and advantages of the present invention, the theory of operation for control system 22 is setforth. Referring to FIG. 1, airflow generated by fan 98 is used to contain the powder in spray booth 12 and to pull the air-entrained oversprayed powder into the powder collector 14. When fan 98 runs at a constant speed, the airflow through spray booth 12 and powder collector 14 decreases as powder collects on filter cartridges 58 to cause the filter pressure to increase, as shown in FIG. 3. The initial airflow in cubic feet per minute (CFM) is higher when the cartridges are unseasoned. After seasoning, system 10 reaches an operating airflow range. However, as spraying continues, cartridges 58 typically get overloaded with powder which, in turn, lowers the airflow through spray booth 12. The booth opening face velocity (the velocity across an open area of the booth), which is proportional to the airflow, establishes the spray conditions. If the airflow, or face velocity, is too high, the powder spray pattern can be pulled away from the part being sprayed causing the powder transfer efficiency to be reduced. Conversely, when the airflow or face velocity is too low, all of the powder will not be contained in the booth and some will leak out through the inlet or outlet openings. Therefore, the airflow balance can be critical in a powder spray operation.

As illustrated in FIG. 3, the initial airflow in cubic feet per minute (CFM) is higher when filter cartridges 58 are unseasoned. After seasoning (loading the cartridges with powder coating material), the system 10 reaches an operating airflow range. However, as spraying continues, the filter cartridges typically get overloaded with powder and cause a reduction in the airflow through spray booth 12. The booth opening face velocity, which is proportional to the airflow, establishes the spray conditions. If the airflow, or face velocity, is too high, the powder spray pattern can be pulled away from the part causing a reduction in powder transfer efficiency. Conversely, if the airflow or face velocity is too low, the powder being sprayed from guns 18A, 18B, 18C will not be contained in the booth but will tend to escape from the entrance and exit openings through which the part enters and exits the booth. Therefore, the airflow balance is an extremely important consideration in a powder spray operation.

The face velocity is also dependent on the booth opening area. Fan 98 is sized to contain powder for a range of booth opening areas. Therefore, variations between systems will cause changes in the face velocity. Even when the face velocity is sufficient to contain powder for booths of all sizes, some powder might be pulled away from guns 18A–18B before reaching the part 42.

The control system 22, as described below, solves the airflow balance problem by controlling the airflow in powder booth 12 by varying the speed of fan 98 to account for variations in the size of spray booth 12 and the degree to which cartridges 58 are loaded with powder. The proper airflow, that contains powder within booth 12 and maximizes transfer efficiency, is set by control system 22. First, the airflow is set to account for the variations in the booth openings, i.e. the size and shape of the entrance and exit openings. Second, as the powder collects on cartridges 58 causing an increase in pressure and a decrease in air flow, as shown in FIG. 3, the control system 22 increases the speed of fan 98 to maintain a substantially constant airflow in powder booth 12. Also, whenever cartridges 58 are pulsed cleaned with air pulse elements 66A,66B, control system 22 reacts by decreasing the speed of fan 98 to maintain a substantially constant airflow.

Figure 2:
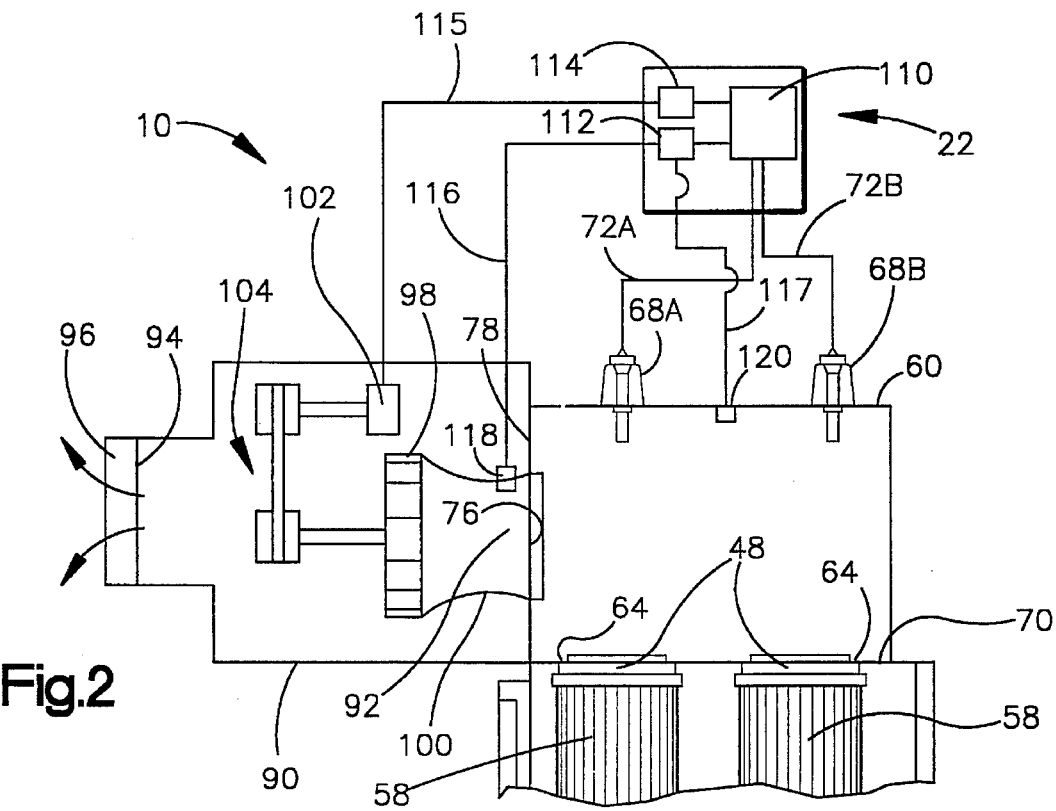
FIG. 2 is a schematic illustration showing a portion of the powder collector of FIG. 1 with an enlarged control system, in accordance with the first embodiment of the invention.

Referring now to FIG. 2, there is illustrated a first embodiment of a control system 22 which includes a controller 110 such as a programmable logic controller (PLC) or a microcomputer, a differential pressure transducer 112, and a frequency drive 114. The controller 110 typically includes an interface circuit (not shown), a mathematical processor (not shown), and a memory unit (not shown). The interface circuit has analog/digital converters at the input thereof for connection to the pressure sensors 118 and 120, and the air pulse elements 66A, 66B. The interface circuit can also have a digital/analog converter at the output thereof for connection to frequency drive 114.

The mathematical processor within control device 22 is adapted to perform pre-determined mathematical operations upon receiving data from the pressure transducer 112 for delivering a control signal to a frequency control 114 to vary the speed of rotation of fan 98 through control of motor 102. The memory unit stores a pre-determined program for performing the mathematical operation in the mathematical processor, together with various data required for such operation.

The differential pressure transducer 112 is connected by a line 116 to a first pressure tap 118 mounted in the throat of inlet cone 100 for measuring the cone throat static pressure $P_S$ and by a line 117 to a second pressure tap 120 in pulse plenum chamber 60 for measuring the total pressure measured $P_T$ in the pulse plenum chamber. The actual airflow ($Q_A$) through the inlet cone 100 can be calculated with the equation $Q_{A1,2,etc.} = K \times 4005 \sqrt{\sqrt{\Delta P_V}}$, where airflow is proportional to the square root of the inlet cone velocity pressure $P_V$. The velocity pressure $P_V$, is determined by subtracting the inlet cone throat static pressure $P_S$ from the total pressure $P_T$ measured in the pulse plenum chamber 60. $P_V$ can be readily measured by differential pressure transducer 112 which in turn generates a velocity pressure signal. The velocity pressure signal is sent from transducer 112 to controller 110, where the velocity pressure signal is converted to the velocity pressure. Then, the velocity pressure is mathematically operated on by the equation $Q_A = K \times 4005 \sqrt{\sqrt{\Delta P_V}}$ with the software in controller 110 to calculate the actual total airflow through inlet cone 100. The actual total airflow $Q_A$ is then subtracted from a command airflow $Q_C$ through inlet cone 100, preset by an operator. Based on this comparison, a fan speed signal is output by controller 100 for continually adjusting the speed of fan 98 so that the actual airflow through inlet cone 100 equals the desired airflow through inlet cone 100. The effect of maintaining a constant command airflow $Q_C$ through inlet cone 100 is that a substantially constant airflow is maintained through powder booth 12. The speed of fan 98 is varied by outputting the speed signal from controller 110 to frequency drive 114 which in turn adjusts the motor drive frequency, and therefore the motor speed, via line 115 to set the speed of motor 102. Motor 102 then rotates fan 98 at a speed (N) through the belt and pulley drive 104.

Airflow control system 22 includes three modes of operation options to operate fan 98: a) a manual fan speed adjustment mode, b) a cleanup mode, and c) an automatic airflow control mode. The manual fan speed adjustment mode enables an operator to set the fan to any desired speed. The manual cleanup mode enables an operator to set the fan to the maximum speed so that the powder which is being blown around in the spray booth, as the latter is being cleaned with compressed air sprayed from an air hose, is exhausted out of the spray booth to be reclaimed in the powder collector 14. The cleanup mode maximizes powder containment in the powder booth 12. The automatic mode enables an operator to set control system 22 to automatically maintain the airflow through powder booth 12 at a desired preset value. In the automatic mode, control system 22 determines the airflow through powder booth 12, based on pressure measurements in pulse plenum chamber 60 and fan exhaust chamber 90 of powder collector 14, and then regulates the speed of motor 102 and fan 98 to compensate for changes in the airflow through the powder collector away from the desired preset value. In addition, the control system 22 can include a pulse on demand mode which is essentially a stand-alone section of controller 110 that includes a cartridge sequential pulsing circuit (not shown) that sequences the opening and closing of the air pulse elements 66A,66B whenever a set pressure range is reached across said cartridge filters 58.

Figure 4A:
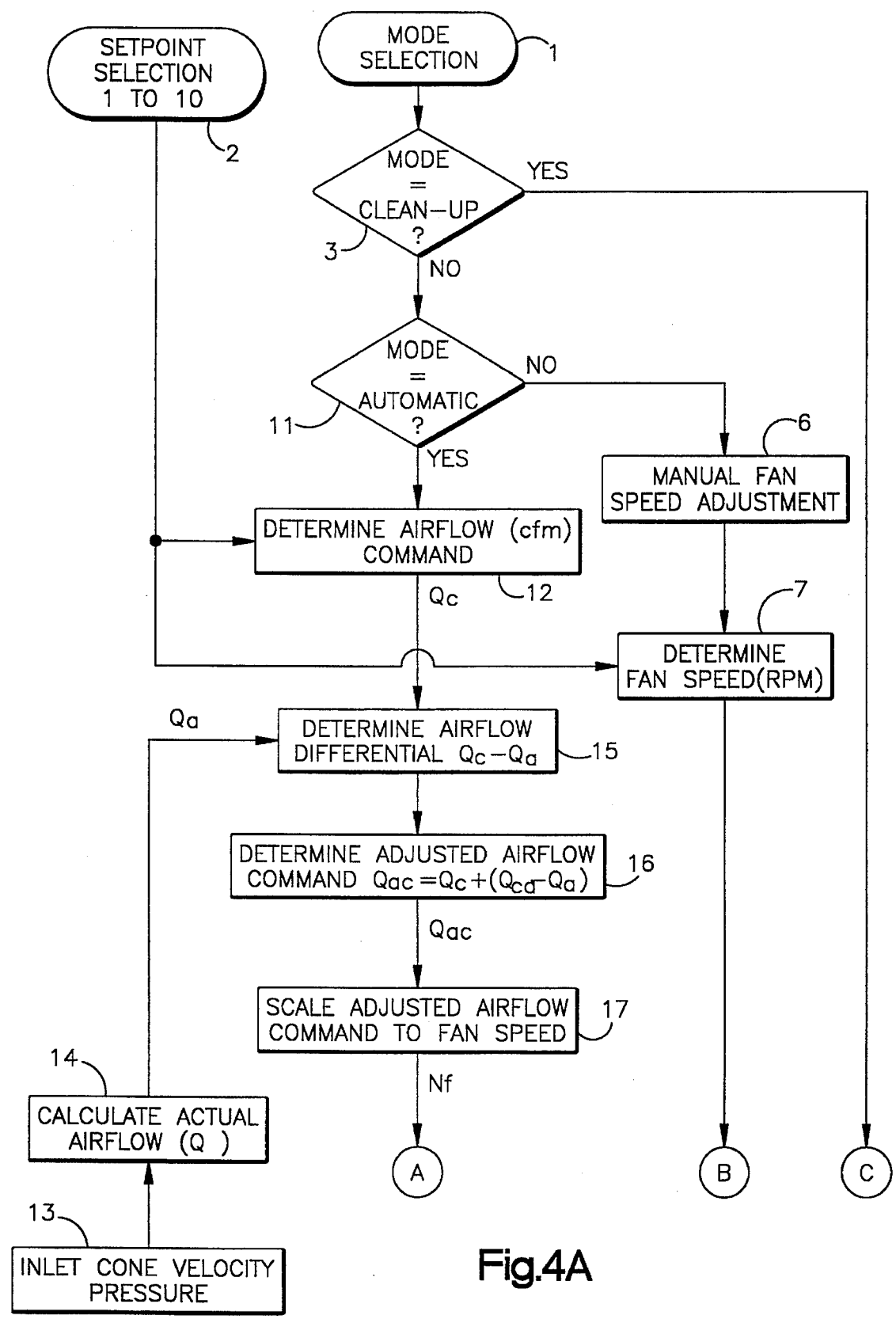
FIG. 4, comprised collectively of FIGS. 4A and 4B, is a flow chart illustrating the operation of the control system shown in FIG. 2.
Figure 4B:
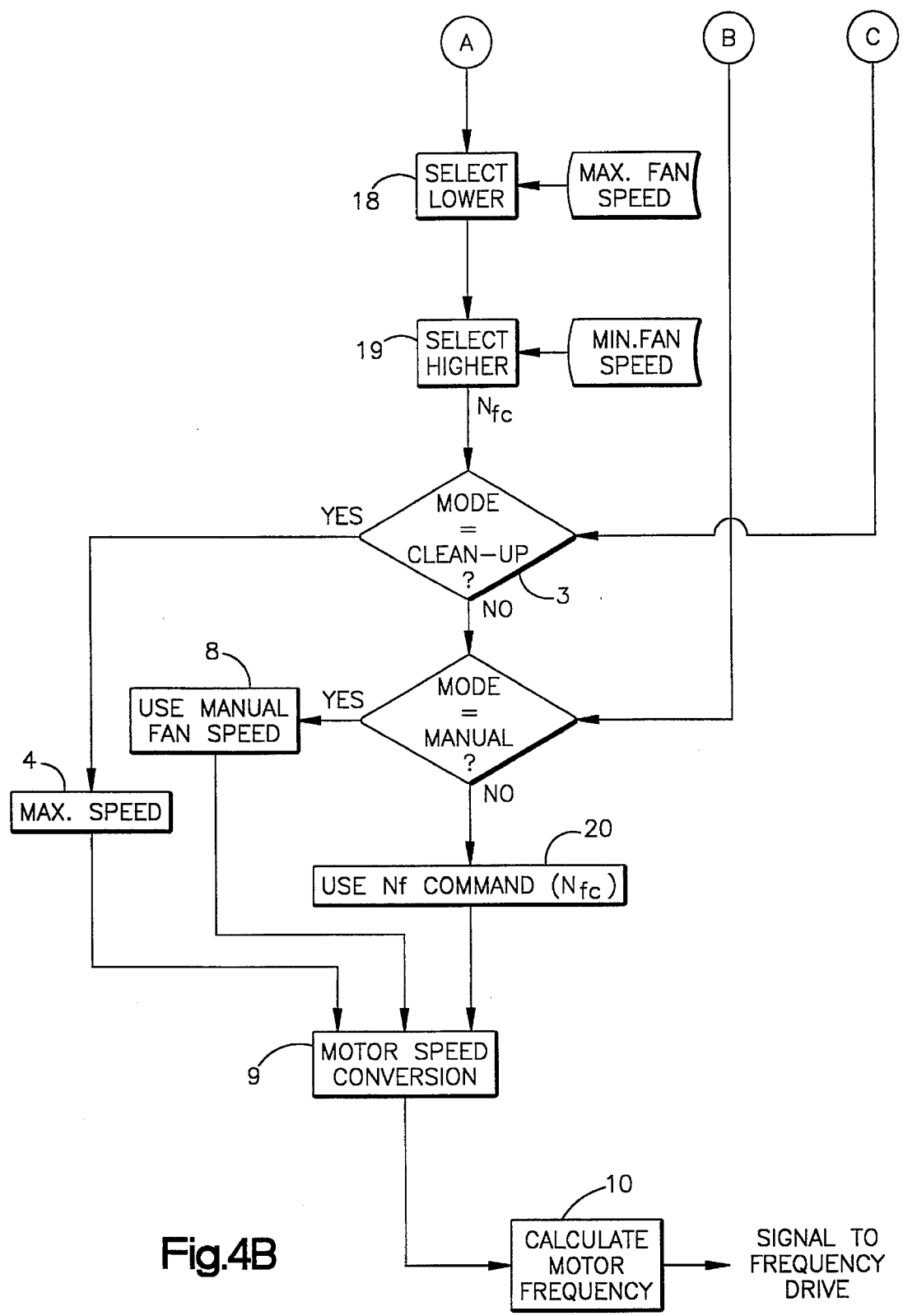

Referring to FIG. 4, there is illustrated a flow chart showing the processing steps performed in control system 22, shown in FIG. 2. The first mode to be considered is the manual mode. Based on signals from an input of the manual mode selection at step 1 and the setpoint selection at step 2, the manual fan speed adjustment at step 6 is set and the fan speed at step 7 is determined, respectively. This in turn generates a signal to use the manual fan speed at step 8. The resulting manual fan speed signal which is output at step 8 is converted at step 9 to a motor speed signal. The motor speed signal is next converted to a motor frequency signal at step 10 and a signal corresponding to a frequency equivalent of the desired motor speed is outputted to frequency controller 114. A resulting frequency signal is then sent through line 115 to set the motor 102 to the desired speed so that fan 98 draws the desired air flow through powder collector 14 and in turn through powder booth 12.

The next mode to be considered is the cleanup mode. Based on an input of the cleanup mode selection at step 1, the cleanup mode at step 3 sends a signal to set the maximum fan speed at step 4. This in turn directs a maximum fan speed signal to be converted to a corresponding motor speed at step 9. The resulting motor speed signal which is output from step 9 is converted to a corresponding motor frequency at step 10. Then, a motor frequency signal is outputted to frequency controller 114, which in turn generates a frequency signal corresponding to a desired motor speed. The motor frequency signal is sent through line 115 to set the speed of motor 102 so that fan 98 rotates at the desired maximum speed to generate an air flow command $Q_c$ that pulls the air entrained powder from spray booth 12 into powder collector 14.

The next significant mode of operation to be discussed is the automatic mode. In this mode, based on an input of the automatic mode at step 1 and the setpoint selection at step 2, the automatic mode is selected at step 11 and a signal corresponding to the desired airflow command ($Q_C$) through powder collector 14 is generated at step 12. The inlet cone velocity pressure at the throat of inlet cone 100 is determined in controller 110 at step 13. Then, the velocity pressure is mathematically operated on by the equation $Q_A = K \times 4005 \sqrt{\Delta P_V}$ with the software in controller 110 to calculate the actual total airflow $Q_A$ through inlet cone 100 at step 14. The actual total airflow $Q_A$, as calculated at step 14, is then subtracted from airflow command $Q_C$ at step 15. The resulting airflow differential is then added to the airflow command $Q_C$ at step 16 to generate an adjusted air flow command $Q_{AC}$. The adjusted airflow command is then scaled to a corresponding fan speed at step 17. This fan speed signal is next compared to a maximum fan speed at step 18 and the lower of the two is selected. The resulting fan speed signal is next compared with the minimum fan speed and the higher of the two is selected at step 19. The final command fan speed signal $N_{fc}$, in the automatic mode, which in turn is generated at step 20, is converted to a signal corresponding to the desired motor speed at step 9. The motor speed signal, in turn, is converted to a corresponding motor frequency at step 10. The resulting frequency signal is outputted to frequency controller 114 through line 115 to set the speed of motor 102 so that fan 98 operates at the desired speed. The fan speed is continually adjusted with controller 22 so that the actual airflow through powder collector 14 equals the commanded airflow whereby a substantially constant airflow is maintained through powder booth 12.

The use of a frequency drive 114 to adjust the speed of motor 102, which in turn controls the air flow through fan 98, allows fan 98 to rotate at a speed that minimizes the motor electrical energy used to power motor 102 and reduces the rotation of fan 98 and therefore the sound level, while maintaining the desired airflow through the powder booth.

Figure 5:
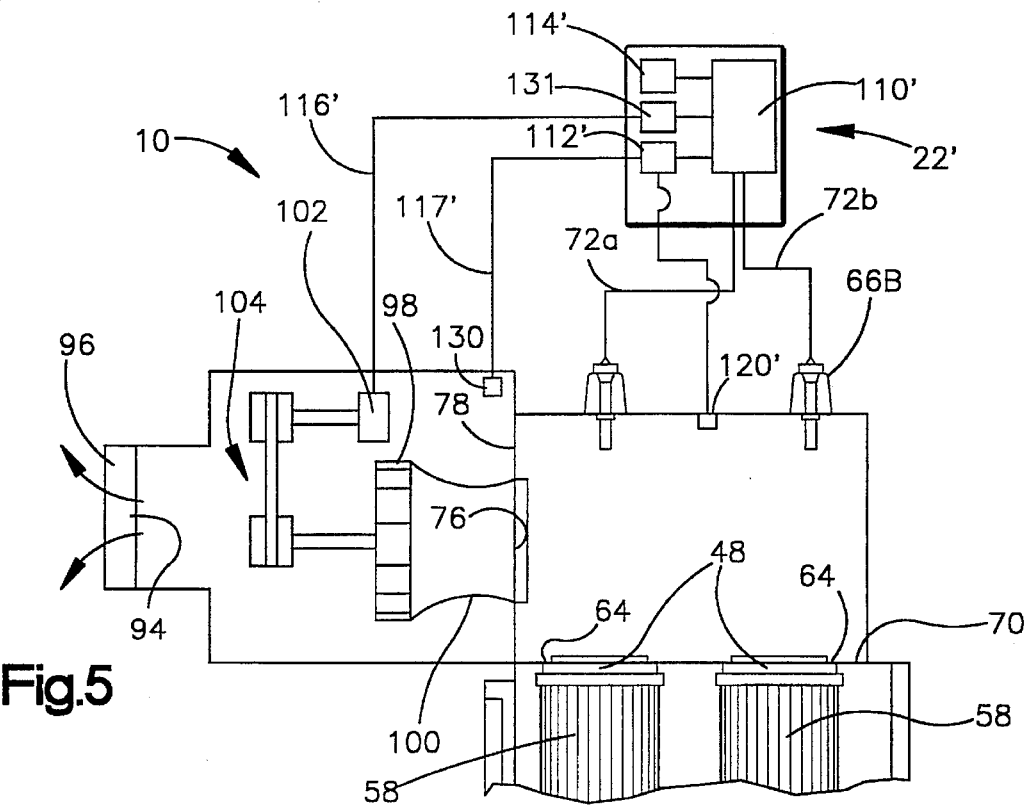
FIG. 5 is a schematic illustration showing a portion of the powder collector of FIG. 1, with an enlarged control system, in accordance with the second embodiment of the invention.

Referring to FIG. 5, there is illustrated a second embodiment of the invention in which the control system 22' uses a total system pressure drop and a fan curve relationship to control the airflow. Throughout the specification primed numbers represent structure elements which are substantially identical to structure elements represented by the same unprimed number. The actual airflow $Q_A$ is a function of the total system pressure drop across cartridges 58, final filter 96, and the speed of fan 98, as shown in FIG. 5. Control system 22' includes a controller 110', such as a programmable logic controller (PLC) or a microcomputer, two differential pressure transducers 112' and 131, and a frequency drive 114'. While two pressure transducers 112' and 131 are illustrated, it is within the terms of the invention to substitute a single pressure transducer adapted to provide the function of two pressure transducers.

Figure 6:
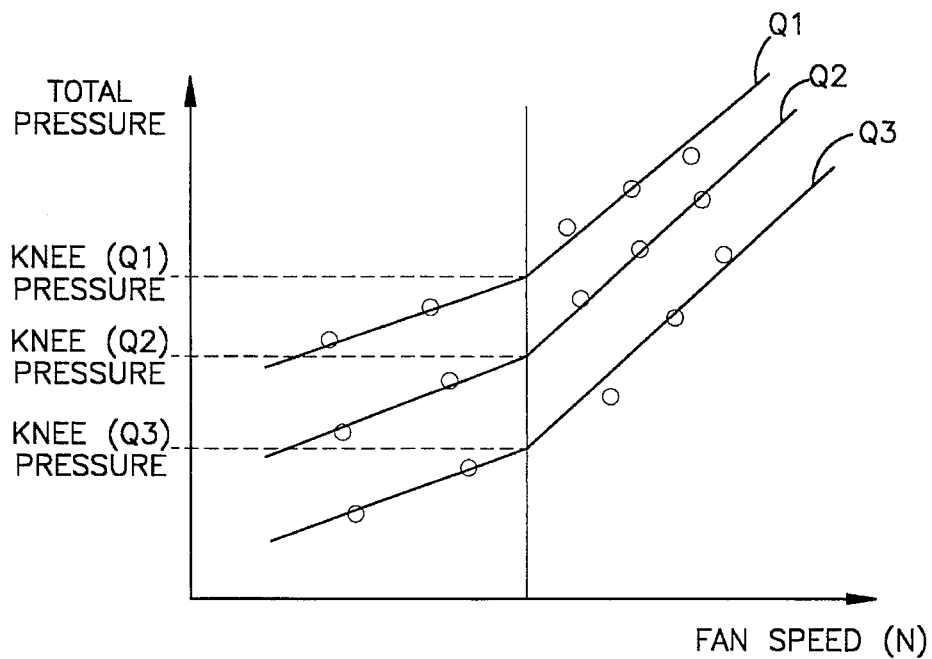
FIG. 6 shows typical airflow curves for the control system shown in FIG. 5 showing the relationship between the pressure and the fan speed depending on he accumulation of powder on the filter cartridges.

In the second embodiment, one of the transducers 112' is connected by a line 117' to a first pressure tap 120' mounted in pulse plenum chamber 60 for measuring the pulse plenum pressure $P_{pp}$ corresponding to the pressure across cartridge filters 58 and outputting a corresponding pulse plenum pressure signal to controller 110'. Second pressure tap 130 is located in fan plenum chamber 104 for measuring the fan plenum pressure $P_{fp}$, corresponding to the pressure across final filters 96 and outputting a corresponding fan plenum pressure signal to controller 110'. Controller 110' converts the pulse plenum pressure signal to a pulse plenum pressure and the fan plenum pressure signal to a fan plenum pressure. Then, total pressure $P_T$, is determined by adding the fan plenum pressure $P_{FP}$ to the pulse plenum pressure $P_{PP}$ in controller 110'. The resulting total pressure $P_T$ is related to the commanded total airflow $Q_{C1}, Q_{C2}, Q_{C3}, Q_{C4}, \ldots Q_{CN}$ desired through powder collector 14 and set by an operator. Each of the airflow lines $Q_{C1}, Q_{C2}, Q_{C3}, \ldots$, as shown in FIG. 6., is nonlinear and determined experimentally. However, the airflow lines have been found to be best linearized and characterized by two separate linear equations which have been found empirically to be separated at a knee pressure $P_K$. While the knee pressures $P_K$ for each airflow line ($Q_{CN}$) is unique, they all occur at the same fan speed. The following equation:

$$N = mP_T + C$$

where

N = the motor speed $P_T$ = the total pressure m = the slope of the air flow line C = a constant (Y intercept)

forms two separate equations with two different values for the slope m and intercept C of each airflow line. All of the data needed to calculate the fan speed is stored in the memory unit of controller 22' which also stores a predetermined program for performing the mathematical operation in the mathematical processor.

In operation, the actual airflow $Q_A$ through powder collector 14 is compared to a desired or command airflow $Q_C$ through the powder collector, preset by an operator in controller 22'. A fan speed unmanned signal is the output from controller 110' so that the speed of fan 98 is continually adjusted to keep the actual airflow through powder collector 14 equal to the command airflow, i.e., a substantially constant airflow is maintained through both powder collector 14 and powder booth 12. Controller 110' controls the speed of fan 98 by controlling the speed of motor 98 with frequency drive 114.

Figure 7A:
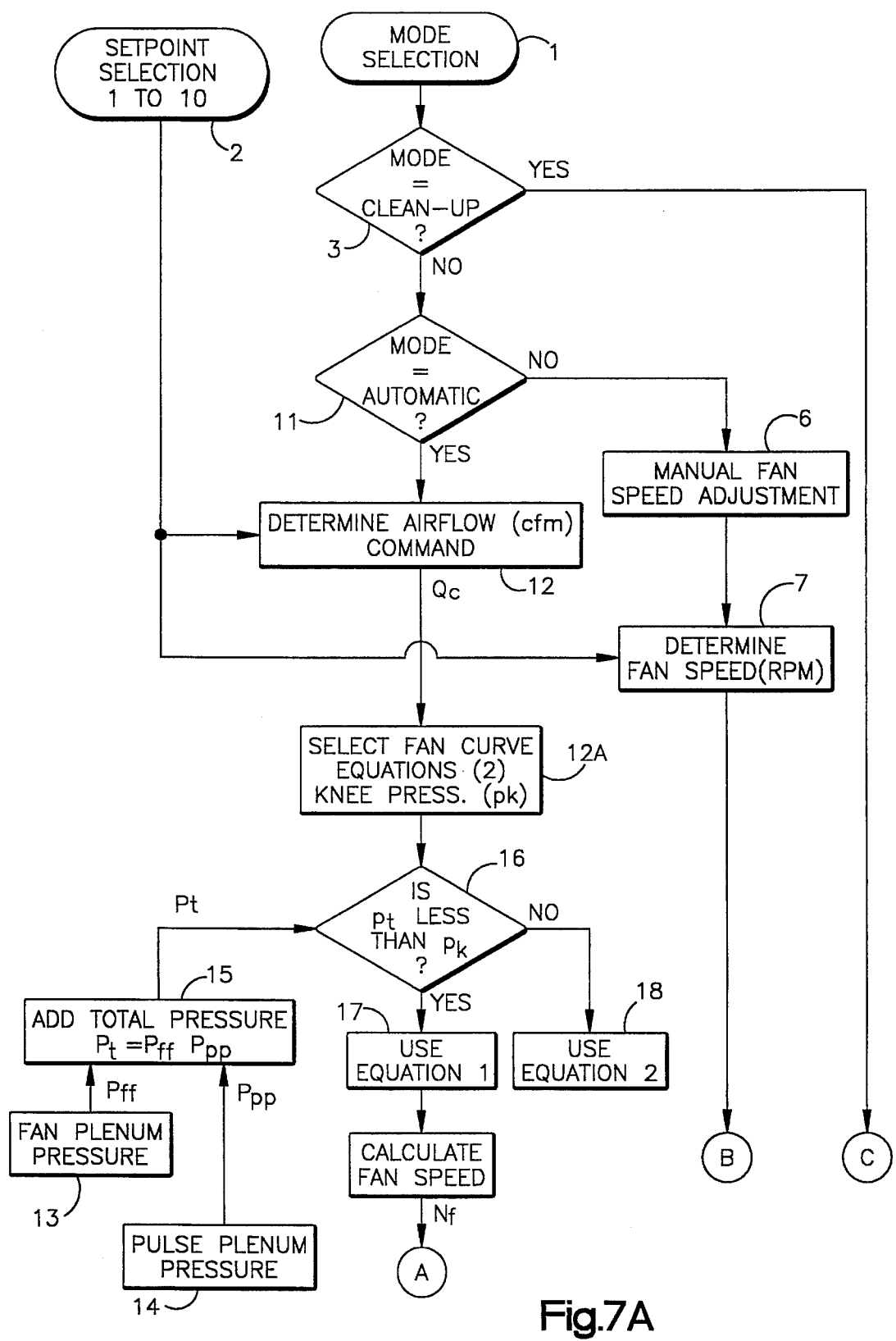
FIG. 7, comprised collectively of FIGS. 7A and 7B, is a flow chart illustrating the operation of the control system shown in FIG. 5.
Figure 7B:
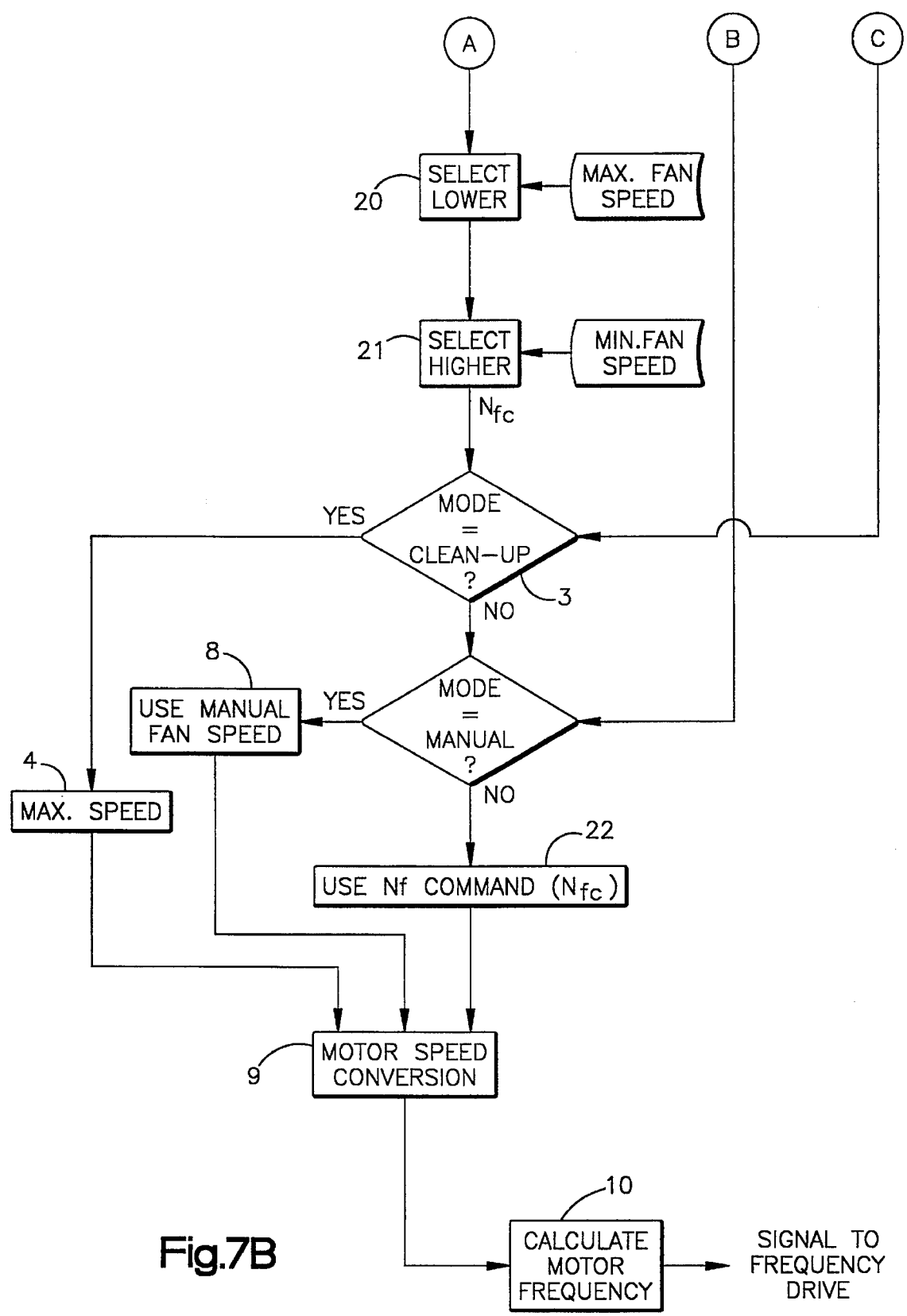

Referring to FIG. 7, there is illustrated a flow chart showing the processing steps performed in control system 22', shown in FIG. 5. The first mode to be considered is the manual mode. Based on an input of the manual mode selection at step 1 and the setpoint selection at step 2, the manual fan speed adjustment at step 6 is set and the fan speed at step 7 is determined, respectively. This in turn outputs a fan speed signal which activates a control to use the manual fan speed at step 8. The fan speed signal is then converted to a motor speed signal at step 9. The motor speed signal is next converted to a motor frequency signal at step 10, and a signal corresponding to a frequency equivalent of the desired motor speed is outputted to frequency controller 114. A resulting frequency signal is then sent through line 115 to set the motor 102 to the desired speed so that fan 98 draws the desired air flow through powder collector 14 and in turn through powder booth 12.

The next mode to be considered is the cleanup mode. Based on an input of the cleanup mode selection at step 1, the cleanup mode at step 3 sends a signal to set the maximum fan speed at step 4. The maximum fan speed signal, in turn, is converted to the desired motor speed signal at step 9. The motor speed signal is then converted to a motor frequency signal at step 10, which in turn is outputted to frequency controller 114 to set the motor 102 through line 115 to the desired maximum speed so that fan 98 operates at the desired maximum speed to generate an air flow that pulls the air entrained powder from powder booth 12 into powder collector 14.

In the automatic mode of operation, based on an input of the automatic mode at step 1 and the setpoint selection at step 2 by an operator, the automatic mode is selected at step 11 and the airflow command ($Q_C$) is determined at step 12 and the fan curve equations are activated in step 12A. The fan plenum pressure $P_{FP}$ across final filter 96 is inputted at step 13 and the pulse plenum pressure $P_{PP}$ across cartridge filters 58 is inputted at step 14. The total pressure $P_T$, is determined by adding the fan plenum pressure $P_{FP}$ to the pulse plenum pressure $P_{PP}$ at step 15. The resulting total pressure $P_T$ is then compared with the knee pressure $P_K$, as shown in FIG. 6, at step 16. If $P_T$ is less than $P_K$, then the equation 1 ($N = mP_T + C$) with the software in controller 110' to calculate the fan speed is selected at step 17. As previously explained, equation 1 uses one value of m and C, as read from a table of values in the software of controller 110'. Conversely, if $P_T$ is greater than $P_K$, then equation 2 ($N = mP_T + C$) is selected at step 18 with second values of m and C. Next, using either equation 1 or 2, as previously determined, the total pressure is mathematically operated on by the formula $N = mP_T + C$, using the appropriate values of m and c, to calculate the fan speed at step 19. The signal corresponding to the fan speed $N_f$ is next compared to a maximum allowable fan speed at step 20 and the lower of the two fan speeds is selected. Continuing, the resulting signal from step 20 is compared with a minimum allowable fan speed and the higher of the two fan speeds is selected at step 21. The resulting final fan speed command signal $N_{fc}$, in the automatic mode, is outputted at step 22 and converted to the desired motor speed at step 9. The motor speed signal is then converted to a motor frequency signal at step 10, which in turn is outputted to frequency controller 114 to set the speed of motor 102 through line 115 so that the speed of fan 98 is continually adjusted so that the air flow through powder collector 14 equals the commanded air flow and a substantially constant air flow is maintained through powder booth 12.

According to the invention, it is apparent that there has been provided in accordance with this invention a method and system for maintaining a substantially constant air flow through the interior of a powder coating booth by regulating the fan in a powder collector which obviate the problems and limitations of the prior art systems. The substantially constant air flow through the interior of a powder coating booth increases the transfer efficiency of the coating powder onto the objects being sprayed, eliminates the need for seasoning the cartridge filters in a collector system prior to system startup, and reduces the noise and operating cost of the system.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A system adapted for controlling air flow through the interior of a powder spray booth, comprising:

a powder collection system adapted to be located adjacent to said powder spray booth for collecting oversprayed powder from said interior of said spray booth, said powder collection system including:

a powder collector having a powder collection chamber with an exhaust opening and one or more air inlet openings, said powder collection chamber having one or more cartridge filters mounted to said air inlet openings;

a pulse plenum chamber having an exhaust port and being connected to said air inlet openings, said pulse plenum chamber having one or more air pulse elements for directing a pulse of air through said air inlet openings and into said cartridge filters through said air inlet openings;

a fan plenum chamber having a fan inlet connected to said pulse plenum chamber and a fan exhaust outlet, said fan inlet having a fan inlet cone mounted thereto and a motor driven fan mounted within said fan plenum chamber for drawing air entrained powder from said powder spray booth through said exhaust opening into said powder collection chamber so that said oversprayed powder is collected on said cartridge filters and filtered air is drawn through said pulse plenum chamber, into said fan plenum chamber and out of one or more final filters mounted to said fan exhaust outlet; and a control system to automatically adjust the speed of said motor driven fan in response to pressure changes in said pulse plenum chamber and said fan plenum chamber of said powder collector so that a substantially constant air flow is maintained through said powder collection system.

2. The system of claim 1 wherein said control system to adjust the speed of said motor driven fan includes:

a differential pressure transducer to output a velocity pressure signal corresponding to the difference between the pressure in a throat of said fan inlet cone and the pressure in said pulse plenum chamber;

a controller receiving said velocity pressure signal from said differential pressure transducer for determining the air flow through said fan inlet cone, subtracting said air flow through said fan inlet cone from a preset commanded air flow to provide a resulting airflow differential and adding said resulting airflow differential to said preset commanded airflow to generate an adjusted air flow command, generating an adjusted air flow command based on said resulting airflow differential, outputting a fan speed signal corresponding to said adjusted air flow command; and a drive device receiving said fan speed signal for adjusting the speed of said motor driven fan so that a substantially constant airflow is maintained through said powder collection system.

3. The system of claim 2 wherein said drive device is a frequency drive for adjusting the frequency of said motor driven fan and controlling the speed of rotation of said motor driven fan.

4. The system of claim 3 further including first and second pressure taps in said pulse plenum chamber and in the throat of said inlet cone, respectively, connected to said pressure transducer.

5. The system of claim 1 wherein said control system can manually set the speed of said motor driven fan.

6. The system of claim 1 wherein said control system is operatively connected to said one or more air pulse elements for sequencing their opening and closing whenever a set pressure range is reached across said cartridge filters.

7. The system of claim 1 wherein said control system to adjust the speed of said fan includes:

a pressure transducer device to output a pulse plenum pressure signal corresponding to the pulse plenum pressure in said pulse plenum chamber, said pressure transducer device outputting a fan plenum pressure signal corresponding to the fan plenum pressure in said fan plenum chamber;

a controller receiving said pulse plenum pressure signal and said fan plenum pressure signal from said pressure transducer device and converting said pulse plenum pressure signal and said fan plenum pressure signal to pulse plenum pressure and fan plenum pressure, respectively, said controller determining a total pressure by adding said pulse plenum pressure with said fan plenum pressure and determining the air flow through said powder collection system relative to the total pressure, said controller comparing said air flow to a preset commanded air flow and generating a fan speed command signal corresponding to the desired air flow through said powder collection system; and a drive device receiving said fan speed command signal for adjusting the speed of said motor driven fan so that the airflow through said powder collection system substantially equals said command airflow.

8. The system of claim 7 wherein said drive device is a frequency drive for adjusting the frequency of said motor driven fan for controlling the speed of rotation of said motor driven fan.

9. The system of claim 7 further including first and second pressure taps in said pulse plenum chamber and said fan plenum chamber connected to said pressure transducer device for sensing pressure corresponding to the pressure across said cartridge filters and said final filters, respectively.

10. The system of claim 9 wherein said pressure transducer device comprises first and second differential pressure transducers, and said first pressure tap in said pulse plenum chamber is connected to said first differential pressure transducer and said second pressure tap in said fan plenum chamber is connected to said second differential pressure transducer.

11. The method adapted for controlling air flow through the interior of a powder spray booth, comprising the steps of:

drawing air-entrained oversprayed powder from said interior of said spray booth into a powder collection system located adjacent to said powder spray booth, said step of drawing including the steps of:

drawing said air-entrained, oversprayed powder from said spray booth through an exhaust opening in a powder collection chamber of a powder collector having one or more cartridge filters mounted to air inlet openings in said powder collection chamber;

drawing filtered air through said cartridge filters into a pulse plenum chamber while said powder collects on said cartridge filters;

drawing said filtered air through said pulse plenum chamber and through a fan inlet cone mounted to a fan inlet of a fan plenum chamber with a motor driven fan mounted within said fan plenum chamber;

exhausting said filtered air through one or more final filters mounted in a fan exhaust outlet from said pulse plenum chamber; and automatically adjusting the speed of said motor driven fan in response to pressure changes in said pulse plenum chamber and said fan plenum chamber so that a substantially constant air flow is maintained through said powder collection system.

12. The method of claim 11 wherein said step of adjusting the speed of said motor driven fan includes the steps of:

generating a velocity pressure signal corresponding to the difference between the pressure in said fan inlet cone and the pressure in said pulse plenum chamber;

determining the air flow through said fan inlet cone;

subtracting said air flow through said fan inlet cone from a preset commanded air flow to provide a resulting airflow differential and adding said resulting airflow differential to said preset commanded airflow to generate an adjusted air flow command;

outputting a fan speed signal corresponding to said adjusted air flow command through said powder collector; and adjusting the speed of said motor driven fan so that a substantially constant airflow is maintained through said powder collection system.

13. The method of claim 12 wherein said step of determining the air flow through said fan inlet cone includes mathematically operating on said velocity pressure $P_V$ by the equation $Q_A = K \times 4005 \sqrt{\Delta P_V}$.

14. The method of claim 12 wherein said step of adjusting the speed includes the step of adjusting the frequency of said motor driven fan for controlling the rotational speed of said fan.

15. The method of claim 13 further including the step of sensing the pressure corresponding to said pressure in said fan plenum chamber with a first pressure tap located in said inlet cone and sensing the pressure corresponding to said pressure in said pulse plenum chamber with a second pressure tap located in said pulse plenum chamber.

16. The method of claim 11 further including the step of manually setting the speed of said motor driven fan.

17. The method of claim 11 wherein said step of adjusting the speed of said motor driven fan includes the steps of:

determining a total pressure $P_T$ corresponding to the combined pulse plenum pressure and fan plenum pressure;

determining the air flow through said powder collection system;

comparing said air flow through said powder collection system to a preset commanded air flow through said powder collection system;

generating a fan speed signal corresponding to said preset commanded air flow through said powder collection system; and adjusting the speed of said motor driven fan so that a substantially constant airflow is maintained through said powder collection system.

18. The method of claim 17 wherein said step of determining said air flow through said powder collection system includes the steps of:

comparing said total pressure $P_T$ with a knee pressure $P_K$ on an airflow line corresponding to said preset commanded air flow;

selecting a first equation $N = mP_T + C$ where N is the speed of said motor driven fan and m and C have a first set of values when $P_T$ is greater than $P_K$ or a second equation $N = mP_T + C$ where m and C have a second set of values when $P_T$ is less than $P_K$; and mathematically operating on said total pressure $P_T$ by said selected first or second equation to generate said fan speed signal.

19. The method of claim 17 further including the step of adjusting the frequency of said motor driven fan for controlling the speed of said fan.

20. The method of claim 17 further including the step of sensing the pressure corresponding to the pulse plenum pressure with a first pressure tap located in said pulse plenum and sensing the pressure corresponding to said fan plenum pressure in said fan plenum chamber with a second pressure tap.

* * * * *

UNITED STATES PATENT AND TRADEMARK OFFICE
CERTIFICATE OF CORRECTION

PATENT NO. : 5,505,763
DATED : April 9, 1996
INVENTOR(S) : Reighard, et. al.

It is certified that error appears in the above-indentified patent and that said Letters Patent is hereby corrected as shown below:

Column 6, line 63, delete "fan inlet." and insert--"fan inlet 92."--.
Column 14, line 47, delete "pulse plenum" and insert--"fan plenum".--.

Signed and Sealed this

Fourteenth Day of January, 1997

Attest:

BRUCE LEHMAN

*Attesting Officer*  *Commissioner of Patents and Trademarks*